United States Patent
Tharp

(10) Patent No.: US 9,796,611 B2
(45) Date of Patent: Oct. 24, 2017

(54) WASTEWATER TREATMENT SYSTEM AND METHOD

(71) Applicant: Environmental Dynamics International, Inc., Columbia, MO (US)

(72) Inventor: Charles E. Tharp, Columbia, MO (US)

(73) Assignee: ENVIRONMENTAL DYNAMICS INTERNATIONAL, INC., Columbia, MO (US)

( * ) Notice: Subject to any disclaimer, the term of this patent is extended or adjusted under 35 U.S.C. 154(b) by 390 days.

(21) Appl. No.: 14/595,666

(22) Filed: Jan. 13, 2015

(65) Prior Publication Data

US 2016/0200608 A1 Jul. 14, 2016

(51) Int. Cl.
| | |
|---|---|
| C02F 3/02 | (2006.01) |
| C02F 1/00 | (2006.01) |
| B01D 35/00 | (2006.01) |
| C02F 3/12 | (2006.01) |
| C02F 103/00 | (2006.01) |

(52) U.S. Cl.
CPC .......... *C02F 3/12* (2013.01); *C02F 2103/001* (2013.01); *C02F 2203/006* (2013.01); *C02F 2209/02* (2013.01); *C02F 2209/40* (2013.01); *C02F 2301/043* (2013.01); *Y02W 10/15* (2015.05)

(58) Field of Classification Search
CPC .. C02F 3/006; C02F 3/02; C02F 11/04; C02F 3/12; C02F 3/30; C02F 2203/00; C02F 2209/02; C02F 9/00
See application file for complete search history.

(56) References Cited

U.S. PATENT DOCUMENTS

| | | | |
|---|---|---|---|
| 5,133,876 A | 7/1992 | Tharp | |
| 5,736,047 A | 4/1998 | Ngo | |
| 6,905,602 B1 | 6/2005 | Dobie et al. | |
| 7,005,068 B2 * | 2/2006 | Hoffland | B01D 21/0012 210/198.1 |
| 7,402,247 B2 * | 7/2008 | Sutton | C02F 3/30 210/603 |
| 7,563,363 B2 | 7/2009 | Kuzma | |
| 8,758,620 B2 | 6/2014 | Tharp et al. | |
| 8,864,993 B2 * | 10/2014 | Zhao | C02F 3/10 210/605 |

(Continued)

*Primary Examiner* — Ana Fortuna

(74) *Attorney, Agent, or Firm* — Husch Blackwell LLP

(57) ABSTRACT

A system and method for treating wastewater in a reactor of the system at or below a predetermined flow rate and at or above a predetermined temperature is provided. Incoming wastewater in excess of the predetermined flow rate is directed to an equalization basin for storage. Wastewater stored in the equalization basin is directed to the reactor when (a) the temperature of such stored wastewater is equal to or greater than the predetermined temperature and (b) wastewater is received by the system at a rate less than the predetermined flow rate. The method also involves the step of repurposing a lagoon basin of an existing lagoon system to function as the equalization basin. The system may further include an integrated control system for directing wastewater stored in the equalization basin to the reactor when predetermined conditions are met.

20 Claims, 6 Drawing Sheets

(56) References Cited

U.S. PATENT DOCUMENTS

| | | | |
|---|---|---|---|
| 2008/0078719 A1* | 4/2008 | Fabiyi | C02F 3/1221 210/626 |
| 2014/0284273 A1* | 9/2014 | Tharp | C02F 3/302 210/620 |
| 2016/0200606 A1* | 7/2016 | Tharp | C02F 3/006 210/601 |
| 2016/0200608 A1* | 7/2016 | Tharp | C02F 3/12 210/620 |

* cited by examiner

WASTEWATER TREATMENT SYSTEM AND METHOD

CROSS-REFERENCE TO RELATED APPLICATIONS

None.

BACKGROUND

Water and wastewater are commonly treated using a variety of techniques. Many conventional municipal and industrial wastewater treatment plants utilize lagoon technologies in treating wastewater. FIG. 1 illustrates a commonly known prior art lagoon system 10 comprising multiple lagoon basins 12 and 14 in series. In many cases, these lagoon technologies are advantageous over alternative options because they require only minimal operator attention, they can be operated by a lower-class operator, and they require a relatively small amount of mechanical equipment. These lagoon technologies are typically capable of minimizing sludge handling procedures; however, such lagoon technologies are not without shortcomings, particularly in providing advanced treatment for wastewater in cold weather when nitrification or nutrient control is desired.

Lagoons have demonstrated excellent capability for biochemical oxygen demand (BOD) removal in all seasons and even nitrification and in some cases de-nitrification in warm weather climates where temperatures are elevated in the lagoon basins. In cold weather, the biological organisms used for executing nitrification and de-nitrification in the lagoons become less effective once the wastewater temperature drops below a certain level, for example, about 8° C. or 10° C. or lower. Once the wastewater temperature drops to these levels, the biological organisms are often not able to undertake full nitrification or de-nitrification in lagoons at these cooler temperatures and the lagoon process has limited control that can be used to improve performance. Synthesis or growth activity of nitrification biological organisms in particular is minimized at these cooler temperatures. Since lagoons typically have a large surface area to volume ratio, wastewater fed into the lagoons often cools rapidly when the ambient air temperature is relatively cold. This loss in basin temperature has an adverse impact on the treatment of the water for carbonaceous BOD removal, but nitrification and de-nitrification activity simply ceases at those lowered lagoon temperatures. Once the biosolids for nitrification and de-nitrification are lost, they are difficult or impossible to re-establish, in the lagoons until warmer weather.

To overcome the limitations of the lagoon system not being able to perform the proper treatment at the lower temperatures, high rate biological reactors have been used in place of lagoons. These high rate biological reactors are quite effective in controlling the variables, as their smaller volume retains heat to maintain basin temperatures in the proper zone for nitrification and nutrient control, as well as carbonaceous BOD removal. In addition, the high rate systems typically have a means for greatly increasing the biomass population through either suspended growth or fixed growth mechanisms and the high population of biomass can serve as a buffer and a treatment biomass even during cold weather temperatures. High rate systems that are properly operated and managed, can deliver the necessary BOD removal and treatment, as well as the necessary nutrient control and removal.

In many of the currently known high rate treatment system technologies, the entire flow of wastewater flowing into the reactor must be treated on a continuous basis. The rate at which the wastewater arrives at the treatment plant often varies dramatically throughout the day and varies even more dramatically during wet weather and storm events. In communities where the separation between sanitary sewer and storm water runoff sewer has become compromised and in communities having a combined sewer system, excessive flow may result at the treatment plant during such wet weather or storm events. Each successive flow event results in a spike in the volumetric flow rate of wastewater that must be treated by the high rate reactor. The high rate reactor is designed to handle a specific volumetric flow rate ($Q_R$). The rate of flow of wastewater into this high rate reactor during a storm event can reach a volumetric flow rate as much as 10 times greater (i.e., $10Q_R$) than the normal design volumetric flow rate $Q_R$. These larger volumetric flow rates put tremendous stress on the high rate reactor and can seriously impact the performance of the wastewater treatment process.

In the prior lagoon systems, the very large volume of the lagoon adequately managed hydraulic flow variation. However, prior lagoons could not deliver the treatment levels necessary as described above and, therefore, the high rate systems are required. The high rate systems must have hydraulic management in order to assure their performance. A flush out or elutriation of the accumulated nitrification and de-nitrification organisms and loss in performance is common in these biological high rate reactors in cold weather storm or high flow events. This loss of biomass may result in a violation of effluent water quality regulations set by a regulatory agency, such as the Environmental Protection Agency (EPA), during the remainder of the cold weather, i.e., until the spring season warm-up.

Accordingly a need exists for a system and method adapted for both managing the flow of wastewater into a reactor and directing the wastewater into the reactor during periods of time when the biological reaction rates within the reactor assure proper treatment, particularly for nitrification and de-nitrification. A need also exists for a system and method for a use of an existing lagoon wastewater treatment basin to function as an influent flow equalization basin in conjunction with a wastewater treatment system including a high rate biological reactor. A further need exists for a system and method for a wastewater treatment system having an integrated control system that redirects wastewater stored in an influent flow equalization basin to a reactor only when (a) the temperature of the wastewater being stored in the influent flow equalization basin is greater than or equal to a predetermined temperature and (b) wastewater is received by the wastewater treatment system at a rate less than a predetermined flow rate.

SUMMARY OF THE INVENTION

To overcome the limitations of conventional lagoon treatment processes, a high rate reactor is provided as an integral part of an existing lagoon infrastructure in the present invention to enhance treatment performance while maintaining the desirable features of the existing lagoon infrastructure. The present invention provides an equalization process and system for implementing thermal control into a wastewater treatment reactor.

One embodiment of the present invention is directed generally to a system and method for continuously treating wastewater in a reactor of a wastewater treatment system at or below a predetermined specified design flow rate and at or above a predetermined specified temperature. The invention can also involve repurposing a first lagoon basin of an existing lagoon system to function as an influent flow equalization basin. The method can also include the step of providing a high rate bioreactor adjacent the influent flow equalization basin, either in an in-line or a side-line configuration. Wastewater may be directed, via a flow diverter, to the high rate reactor at a flow rate that is equal to or less than a predetermined maximum flow rate for which the reactor is designed. When the total flow of wastewater received by the system is in excess of the predetermined flow rate for which the reactor is designed, the excess wastewater can be directed to the influent flow equalization basin for storage until the inlet peak flows are reduced below the predetermined flow rate.

In one embodiment, the reactor is in a side-line or adjacent configuration and a return pump is provided within the influent flow equalization basin for directing the wastewater stored within the influent flow equalization basin to the reactor, either directly or via the flow diverter. Wastewater stored within the influent flow equalization basin is transferred to the reactor when (a) the temperature of the wastewater stored within the influent flow equalization basin is equal to or greater than the predetermined temperature and (b) the flow rate of wastewater into the system is less than the reactor's maximum design flow rate. The predetermined temperature falls within a range of between about 6° C. and about 14° C. in one embodiment, falls within a range of between about 8° C. and about 12° C. in another embodiment, or may be approximately 10° C. in yet another embodiment.

In an alternative embodiment, the reactor is in an in-line configuration and the wastewater stored within the influent flow equalization basin is continuously discharged from an outlet port of the influent flow equalization basin to an inlet port of the downstream reactor. A valve and/or pump may be positioned between the influent flow equalization basin and the reactor for controlling the flow of wastewater from the influent flow equalization basin to the reactor at a rate that is equal to or less than the predetermined flow rate for which the reactor is designed, as long as the temperature of the wastewater is suitable for nitrification and/or de-nitrification (e.g., in a range of about 6° C. to about 14° C. or above).

The reactor can be adapted for incorporating a solids management function into an existing lagoon infrastructure. A waste activated sludge (WAS) pump may be provided within the reactor for discharging WAS from the reactor to the influent flow equalization basin or another basin, digester, sludge management structure, disposal site or facility.

A second lagoon basin of the existing lagoon system may be repurposed to function as a polishing pond and/or an effluent flow equalization basin. Additionally, an effluent equalization tank can be provided downstream of the reactor. The effluent flow equalization basin and/or effluent equalization tank can be adapted for discharging water at a rate that does not exceed a predetermined discharge rate.

To further the treatment of the wastewater, a flocculation tank is optionally provided downstream of the reactor to enhance the removal of contaminants such as phosphorus. An alum or other flocculation chemical can be added to the wastewater in the system in order to cause the phosphorus (or other contaminants) to come out of suspension in the form of floc that can be captured and removed from the water by a downstream filter or in the polishing pond. Solids collected by the filter can then be directed to the influent flow equalization basin for storage or to another basin, digester, sludge management structure, disposal site or facility.

A further aspect of the present invention is directed to a method for modifying, adapting or retrofitting an existing lagoon system through repurposing one or more of the existing lagoon system's components and through the addition of and combination with further components, such as the reactor, in order to enhance treatment performance while maintaining the desirable features of the existing lagoon infrastructure.

Other aspects and advantages of the present invention will be apparent from the following detailed description of the preferred embodiments and the accompanying drawing figures.

DESCRIPTION OF THE SEVERAL VIEWS OF THE DRAWING

In the accompanying drawing, which forms a part of the specification and is to be read in conjunction therewith, reference numerals are used to indicate like or similar parts in the various views.

DETAILED DESCRIPTION OF THE INVENTION

Figure 1:
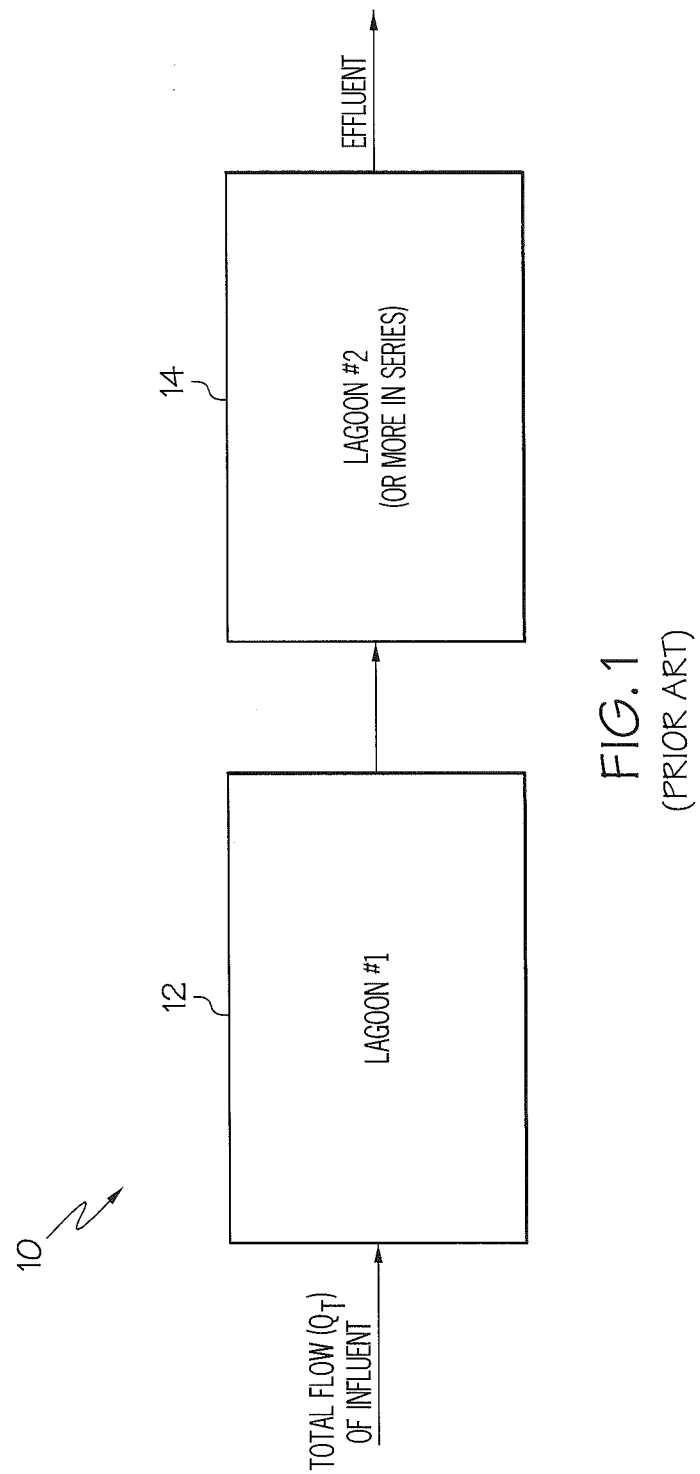
FIG. 1 is a plan view of a long hydraulic detention lagoon system, which may be known to detain wastewater from between about 5 and 60 days, in accordance with the prior art.
Figure 2:
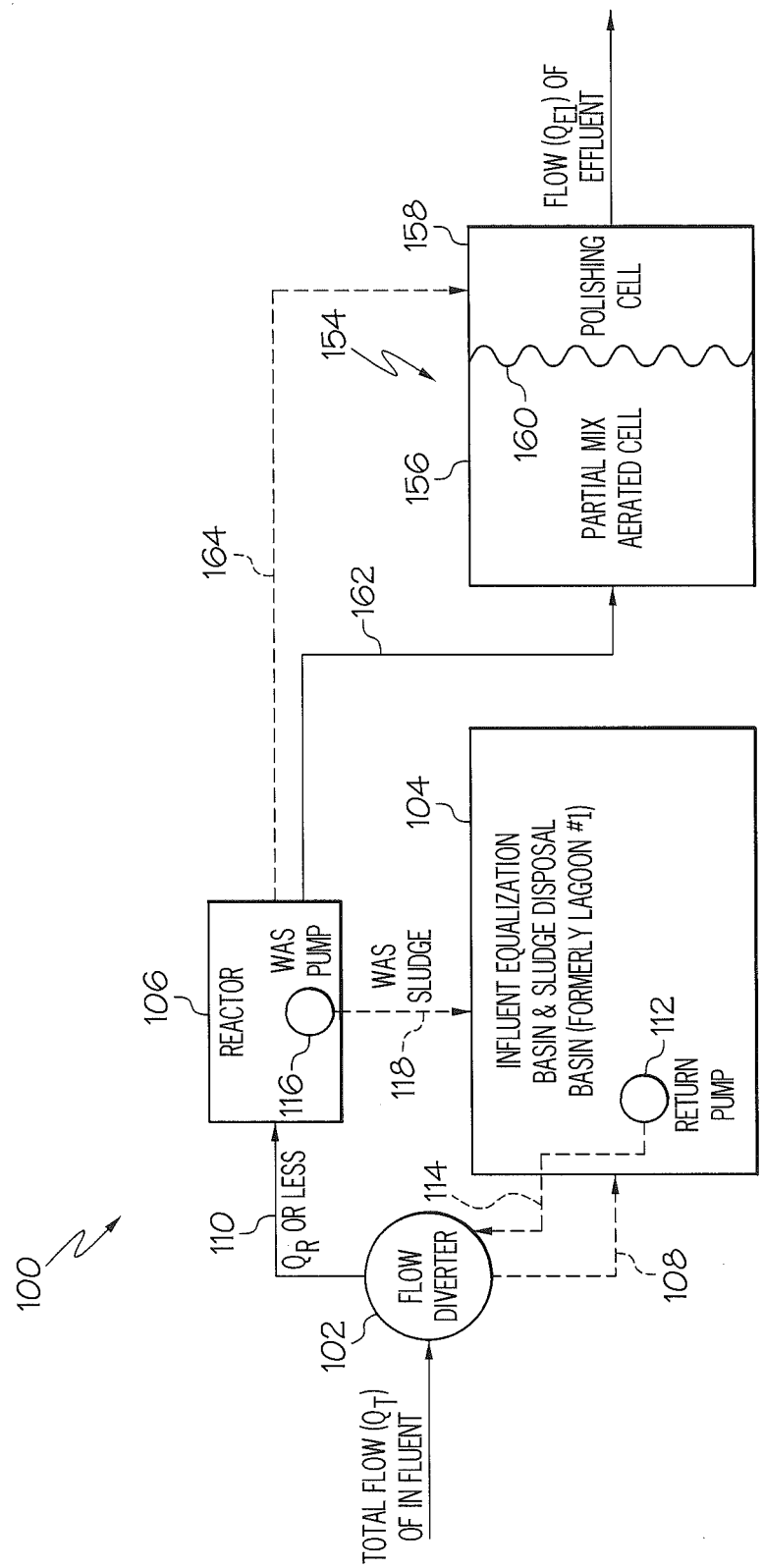
FIG. 2 is a plan view of a wastewater treatment system in accordance with a first embodiment of the present invention.
Figure 3:
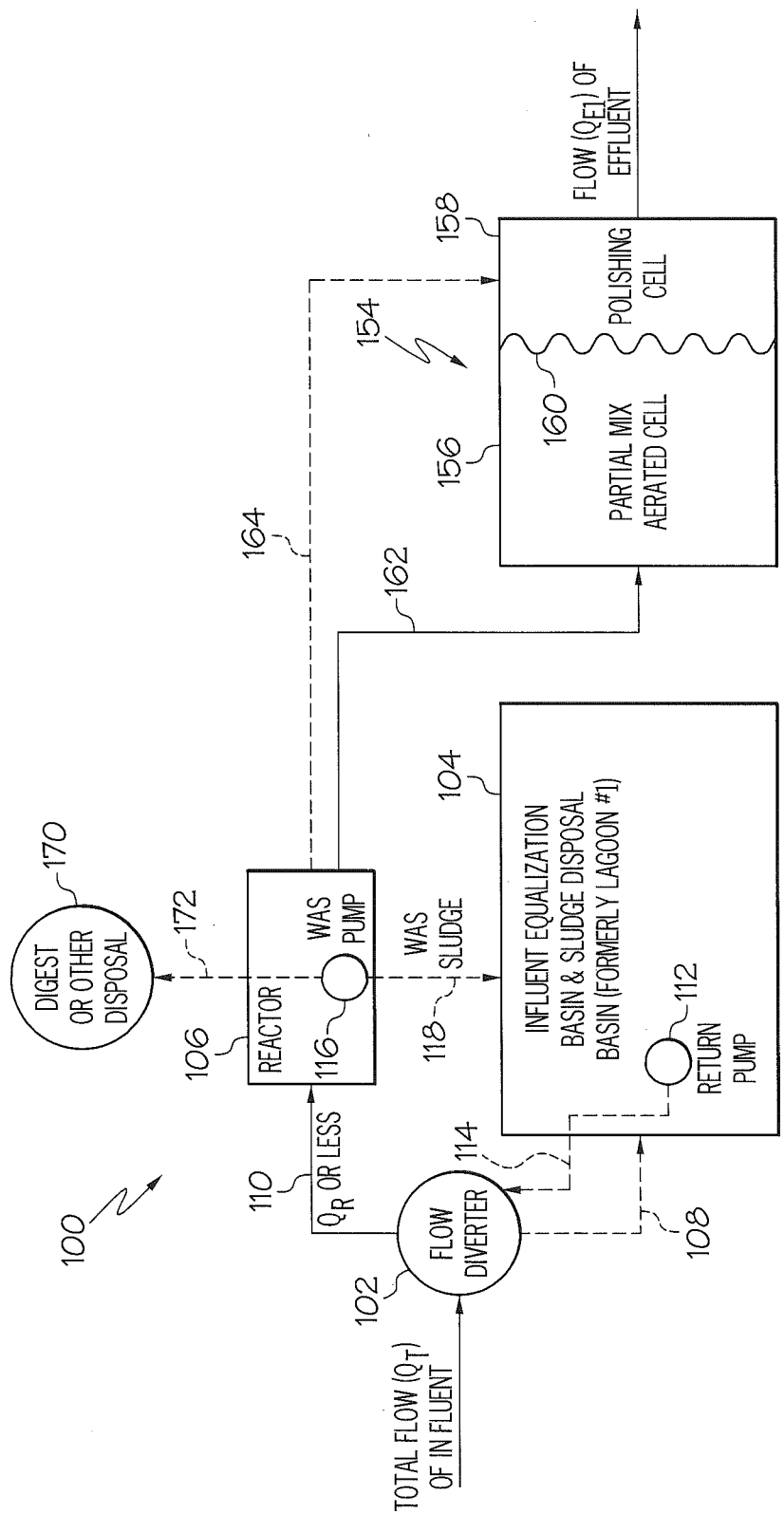
FIG. 3 is a plan view of a wastewater treatment system in accordance with a second embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

The present invention is directed generally to a wastewater treatment system 100 and method capable of flow equalization and also capable of holding wastewater generated during storm events and during cold weather months for extended periods of time. The system 100 may be implemented to repurpose existing lagoon basins 12 and 14 of an existing lagoon system 10 and use them as integral components of the system 100. In many cases, the existing lagoon basins 12 and 14 do not need to be closed, do not need to be cleaned and can be used as is. The system 100 may take on a modular construction wherein additional components are added to meet increasingly stringent requirements without disturbing the existing components.

Turning to FIGS. 2-6, various embodiments of the system 100 include a flow diverter 102, the existing repurposed or retrofitted lagoon 12 as an influent flow equalization basin 104 and a new high rate reactor 106. As will be discussed in greater detail below, the system 100 is designed to ensure that the volumetric flow rate of influent wastewater into the high rate reactor 106 does not generally exceed the predetermined maximum flow rate ($Q_R$) for which reactor 106 is designed to handle.

The components of the system 100 are connected by respective "conduits," which will be understood to include any suitable piping, tubing, channels, ducts, canals or the like, whether open or closed, through which wastewater may flow, and may further include suitable valves, gates and/or pumping mechanisms to control the flow of wastewater between the respective components. It will be appreciated that the connections between the components of the system 100 may be constructed to provide direct or indirect flow paths and can optionally include ancillary flow paths and processes. Though not shown in detail in the figures, it will be understood that each of the components of the system 100 can include one or more inlet ports and one or more outer ports through which the wastewater flows into and out of each of the respective components.

Flow Diverter 102

The flow diverter 102 may comprise a flow splitter, splitter box and/or pump station. The flow diverter 102 directs the total flow ($Q_T$) of influent wastewater to both of (a) the existing lagoon or influent flow equalization basin 104 via conduit 108 and (b) the reactor 106 via conduit 110, as needed. The flow diverter 102 is designed to continuously pass flow of influent wastewater to the reactor 106 at volumes equal to or less than the reactor's design flow rate $Q_R$. If the total flow $Q_T$ of influent wastewater flowing into the diverter 102 is equal to or less than the reactor's predetermined maximum flow rate $Q_R$, then the entire total flow $Q_T$ of incoming wastewater is directed to the reactor 106. However, in cases, for example during a storm event, where the total flow $Q_T$ of influent wastewater flowing into the diverter 102 is greater than the design flow rate $Q_R$ of the reactor 106, then only a first portion of the total flow $Q_T$ is directed to the reactor 106 at a rate equal to or less than reactor's predetermined maximum flow rate $Q_R$. In such cases, a second portion of the total flow $Q_T$ that is equal to or greater than the excess flow ($Q_E$) ($Q_E = Q_T - Q_R$) is directed by the flow diverter 102 to the equalization basin 104 for storage and/or flow equalization. In other words, any portion of the influent wastewater total flow $Q_T$ that is not directed to the reactor 106, is directed to the equalization basin 104 for storage and management.

The system 100 incorporates the additional feature of thermal control for the equalization process. In this regard, if the influent wastewater flowing into the diverter 102 is below a predetermined or specified temperature (e.g., below approximately 10° C.), the excess flow directed into the equalization basin 104 can be stored in the equalization basin 104 until warmer weather and until the stored wastewater increases to a temperature level at or above approximately 10° C. or other suitable temperature limit. It will be appreciated that the temperature of the wastewater stored in the equalization basin 104 and/or influent wastewater may be measured continuously, intermittently or may be determined by calculating the average temperature of the wastewater stored in the equalization basin 104 and/or influent wastewater over a specified period of time. The temperature of the wastewater may be based on a single measurement, or an hourly average, daily average, weekly average or average taken over any other suitable period of time. Alternatively, the temperature of the influent wastewater may be estimated by measuring the temperature of the ambient air or a component of the system 100 or the like.

In accordance with the system's 100 thermal control of the equalization process, once the wastewater being stored in the equalization basin 104 warms to an acceptable temperature of at about 3° C. to about 10° C., for example, the wastewater in the equalization basin 104 can be recirculated, via a return pump 112 and conduit 114, back to the diverter box or flow diverter 102 and directed to the reactor 106 in order to maintain flow to the reactor 106 and reduce the volume of wastewater in the equalization basin 104. Alternatively, the wastewater at the acceptable temperature in the equalization basin 104 may be pumped directly from the equalization basin 104 to the reactor 106. If the total flow $Q_T$ of influent wastewater flowing into the diverter 102 is less than the design flow rate $Q_R$ of the reactor 106 and the wastewater in the equalization basin 104 is at or above the designated temperature of about 3° C. to about 10° C., the wastewater being stored in the equalization basin 104 may be added to that influent flow at a rate such that the flow into the reactor 106 does not exceed its design flow rate $Q_R$. The flow from the equalization basin 104 may be continuous or intermittent and may be of a constant or variable volume. It will be understood that the equalization basin 104 may be equipped with a thermometer, thermistor or other temperature-measuring device (not shown) that regulates that operation of the return pump 112. It will be appreciated that the temperature of the wastewater in the equalization basin 104 may be measured continuously, intermittently or may be determined by calculating the average temperature of the wastewater in the equalization basin 104 over a specified period of time. Alternatively, the temperature of the wastewater in the equalization basin 104 may be estimated by measuring the temperature of the ambient air or a component of the system 100 or the like.

In one embodiment, weirs (not shown) within the diverter 102 may be used to allow only a flow rate of approximately $1.0Q_R$ (or an approximate average of $1.0Q_R$ over a period of time) to go forward to the reactor 106. Notwithstanding the foregoing, it will be understood that, in some cases, the volumetric flow rate of wastewater into the equalization basin 104 may be more or less than the design flow rate $Q_R$. Further, the amount of wastewater reaching to the reactor 106 may be a function of the wastewater's temperature in the equalization basin 104. For example, even if the temperature of the wastewater held in the equalization basin 104 is less than 10° C., it may still be added to the flow into the reactor 106, particularly in cases where the temperature of the influent flow is greater than the designated temperature of about 3° C. to about 10° C. In other words, in one embodiment, so long as the temperature of the mixture of the flow of influent wastewater and the flow of wastewater from the equalization basin 104 is at least the designated temperature, wastewater from the equalization basin 104 may be recirculated even though it is at a temperature less than 10° C. It will be appreciated that while a predetermined temperature of 10° C. is provided as an example herein, such a predetermined temperature is not meant to be limiting and other predetermined temperatures (e.g., 3° C., 6° C., 8° C., 12° C., 14° C., etc.) are also within the scope of the present invention.

Influent Flow Equalization Basin 104

The equalization basin 104 is generally the repurposed existing primary lagoon 12 in a system to be upgraded and may be adapted to mitigate or dampen changes in the volumetric flow rate $Q_T$ of the influent wastewater by providing storage to hold wastewater when it is arriving at the system 100 too rapidly, and to supply wastewater to the reactor 106 when it is arriving at the system 100 at a flow rate less than the reactor's design flow rate $Q_R$. Further yet, the equalization basin 104 is adapted for storing excess cold (e.g., below 10° C.) influent wastewater greater than $Q_R$ until it warms, i.e. until spring or summer, thereby providing the system 100 with thermal control for optimum nitrification and de-nitrification. While the equalization basin 104 may not provide significant treatment capabilities, it can be used to manage and store incoming solids similar to its original lagoon 12 design of FIG. 1. Also, the practice of storing WAS solids in the equalization basin 104 can eliminate the steps of dewatering the solids, and hauling the solids from the treatment location and other steps, such as the application of chemicals. Because the primary solids stored within the equalization basin 104 are modest from dilute wastewater and the WAS from the reactor 106 is typically very stabilized, only a limited amount of aeration and mixing is required in the equalization basin 104. In fact, in one embodiment, the amount of air or oxygen applied to the water in the equalization basin 104 is only about 10% of that applied in the reactor 106. Due to the lower aeration requirement, a blower system used to aerate the equalization basin 104 may be part of the same blower system used to aerate the reactor 106, may be a blower system that is completely independent of the blower system used to aerate the reactor 106, or may be a blower system that is a hybrid between blower components used to aerate the reactor 106 and blower components that are in addition to those used to aerate the reactor 106. When the volume of the equalization basin 104 is large, natural lagoon aeration may provide adequate oxygenation without the use of blowers supplying air to diffusers.

As illustrated, a first lagoon basin 12 of an existing lagoon system 10 may be repurposed to serve as the influent flow equalization basin 104 of the system 100 of the present invention. The former lagoon basin 12 may be too shallow to act as high capacity reactor as described in U.S. patent application Ser. No. 13/448,537 (U.S. Publication No. 2013/0270182) filed on Apr. 17, 2012 to Charles Tharp, et al., entitled "Decanted Bio-Balanced Reactor and Method" (the "'537 application"), may have too flat of a side slope to mix or other geometrical limitations or may be lined. The modification of the former lagoon basin 12 or the removal of sludge therefrom could lead to significant costs and/or the liner being damaged. As such, in one embodiment of the system 10, the liner and any sludge therein may be left in place and the lagoon basin is still suited to function as an influent flow equalization basin 104.

The influent flow equalization basin 104 may be used for temporary storage of influent water resulting from diurnal or wet weather flow peaks, as well as cold influent water. The influent flow equalization basin 104 may be designed as either a side-line unit where the influent flow equalization basin 104 may be provided in parallel with the reactor 106, as illustrated in FIGS. 2-5, or an in-line unit where the influent flow equalization basin 104 may be provided in series with the reactor 106, as illustrated in FIG. 6. In the preferred side-line design shown in FIGS. 2-5, only the amount of flow that is above the design flow rate $Q_R$ is diverted through the equalization basin 104 and thermally controlled to maximize downstream biological processes.

In the in-line design shown in FIG. 6, all of the influent flow $Q_T$ passes through the equalization basin 104. Wastewater will be released to the reactor 106 at a volumetric flow rate is generally equal to or less than the design flow rate $Q_R$. As demonstrated in the in-line embodiment of FIG. 6, the reactor 106 is connected to the equalization basin 104 via a conduit 150 that may include a valve 152 and/or a pump for controlling the flow rate of wastewater into the reactor 106.

If the volumetric flow rate $Q_T$ of the influent wastewater spikes to a large flow rate as the result of wet weather or a storm event (e.g., rain shower, snow melt, etc.), the equalization basin 104 acts to store that increased volumetric flow rate and provide wastewater to the reactor 106 at a generally constant rate. As discussed above, any influent wastewater that is diverted to the equalization basin 104 may later be pumped back to the diverter 102, via a return pump 112 and conduit 114, provided that the stored wastewater (or mixture of wastewater) is above the specified temperature, and then directed to the reactor 106 for treatment. In one embodiment, the equalization basin 104 is designed to act as a buffer in order to achieve a constant, or nearly constant, volumetric flow rate through the reactor 106, at least part of the time while storing excess wastewater for temperature management of the reactor 106.

The equalization basin 104 may be sized to store a sufficient amount of influent wastewater. For example, the equalization basin 104 may be sized to hold between about 5 and 60 days' worth of the total flow ($Q_T$) of influent wastewater in cases where all of the influent flow is directed to the equalization basin 104. However, in cases where a first portion (e.g., $Q_R$ or less) of the total flow ($Q_T$) of influent wastewater is directed to the reactor 106, which is typically the case, only an excess portion of the influent wastewater (e.g., $Q_E$, where $Q_E = Q_T - Q_R$) is directed to the equalization basin 104. In such cases, the equalization basin 104 may be sized to hold between about 120 and 180 days' worth of the excess flow ($Q_E$) of the influent wastewater. However, it will be appreciated that the equalization basin 104 may be sized to hold amounts of wastewater other than those provided as examples herein. Typically, all wastewater discharged from the equalization basin 104 is directed through the reactor 106 to assure maximum treatment.

If the influent wastewater accumulating in equalization basin 104 is of a temperature below a specified temperature (e.g., below 10° C.), some or all of that influent wastewater may be stored in the equalization basin 104 until it warms in spring or summer Wastewater collected by the equalization basin 104 can be stored during the colder months and then directed through the reactor 106 for treatment during the warmer months when the biological reaction rates assure proper treatment for nitrification or de-nitrification. It is also imaginable that colder influent wastewater may be blended with warmer wastewater contained in the equalization basin 104 and that the blended wastewater can then be directed through the reactor 106, so long as the blended or mixed wastewater is at or above the specified temperature.

Additionally, the equalization basin 104 can serve the purpose of damping wastewater loadings that are particularly contaminated. If the flow of influent wastewater has a relatively high level of contamination, some or all of that influent wastewater may diverted to the equalization basin 104 so that it may be blended with the wastewater already contained therein that is not as contaminated in order to dilute such contamination levels of wastewater prior to treatment by the reactor 106.

As set forth above, typically, all wastewater discharged from the equalization basin 104 is directed through the reactor 106 to assure maximum treatment. However, it is conceivable that a major hydraulic event could occur when the equalization basin 104 and/or polishing pond 120 are full or nearly full from storage during the winter months. In such a condition, excess flow entering the system 100 can be passed through the equalization basin 104, passed from the equalization basin 104 to the polishing pond 120 via conduit 174, passed from the polishing pond 120 to a filter 138 via conduit 142, and then discharged from the filter 138 as effluent flow. In this scenario, the filter 138 would remove sludge or excess solids present in such excess flow passing therethrough. The filtered sludge and excess solids can be directed from the filter 138 back to the equalization basin 104 or, alternatively, to another basin, digester 170 or other disposal, sludge management structure, disposal site or facility. The excess flow entering the system 100 during such a major hydraulic event may be between about two times and about 10 times greater than the normal design volumetric flow rate $Q_R$. Beneficially, this excess flow would result in the dilution of the concentration of any ammonia or other contaminants, thereby dramatically reducing the concentration of ammonia or other contaminants (e.g., by a factor of about two times to about 10 times) discharged in the effluent flow from the system 100. Additionally, a substantial portion of the excess flow (e.g., up to a volumetric flow rate $Q_R$) would still be treated by the reactor 106. The blend of the two separate flows would also reduce the concentration of ammonia or other contaminants contained in the effluent flow during these dire circumstances.

Reactor 106

The high rate bioreactor 106, which may be of a single basin structure, is an additional component constructed outside of the existing lagoon system 10 or a divided section of one of the existing lagoons 12 or 14 of FIG. 1. The reactor 106 may be in the form of an earthen basin, concrete tank or basin, metallic tank, plastic tank or any other suitable basin, tank or reservoir now known or hereafter developed. The reactor 106 may be suitable for nitrification, de-nitrification and carbonaceous biological oxygen demand (BOD) removal. The reactor 106 may be a sequencing batch reactor (SBR), an intermittently decanted extended aeration lagoon reactor (IDEAL), may be a decanted bio-balanced reactor (DBBR) designed in accordance with the teachings of the '537 application, the entire disclosure of which is incorporated herein by reference, or may be any other suitable reactor now known or hereafter developed. As set forth above, the reactor 106 is designed to handle a flow rate of wastewater therethrough that is equal to or less than a predetermined flow rate $Q_R$.

The reactor 106, which can contain submerged bio media, as described in the '537 application, may be designed to eliminate the need for separate clarifiers, sludge return pumps and other equipment that may otherwise be required. The reactor 106 may be suitable for treating the wastewater in an extended aeration process with a relatively low food to microorganism (F/M) ratio in order to provide a long-term performance for nitrification. The F/M ratio may be between about 0.02 to about 0.1, for example. With the present invention, the detention time of the water within the reactor 106 may be reduced. For example, in one embodiment, the detention time within the reactor is approximately 30 hours or less. This relatively short detention time facilitates treating the water at a desirable maintained temperature. The treated water discharged from the reactor 106 can have ammonia levels less than 1.0 mg/L and total nitrogen levels less than 10 mg/L even during reactor temperatures less than 10° C. As discussed in greater detail below, it will be appreciated that the biomass within the reactor 106 can be developed to increased levels prior to an anticipated cold weather so that the treatment of the wastewater within the reactor 106 can be sustained even during periods of cold weather. This can prevent hydraulic flush out and prevent any long term elutriation of the biomass within the reactor 106 during such periods of cold temperatures. While the microorganisms, frequently called "bugs," within the reactor may not operate as well at very cold temperatures, they can continue to live and grow at these cold temperatures and such growth can be enhanced when brought to increased levels prior to the decrease in temperature.

The reactor 106 can optionally include a pump 116 for removing WAS from the reactor 106 via a conduit 118 and discharging it into the equalization basin 104, as illustrated in the figures. In cases where the equalization basin 104 is in the form of a repurposed existing primary lagoon 12, this presents additional benefits. First, the equalization basin 104 already contains a significant amount of sludge from its previous use as a stabilization lagoon 12. Second, the amount of sludge pumped from the reactor 106 will be modest and well stabilized so pumping such a modest amount of sludge into the equalization basin 104 will not create any harm and will further provide an easy solids management and/or disposal. Third, the equalization basin 104 has much longer detention times than what is typically required for sludge storage and disposal. Fourth, to the extent any ammonia rebound from the sludge storage (i.e., ammonification of the sludge) in the equalization basin 104 occurs, such ammonia rebound will be handled because the wastewater in the equalization basin 104 is directed back to the reactor 106 for a high rate biological process. The wastewater in the equalization basin 104, including any ammonia rebound or release from primary solids or WAS, does not exit the system as effluent without being treated or retreated in the reactor 106 and protects effluent quality in spring or summer warming conditions, particularly when using a polishing pond 120.

Sludge or excess solids that are not removed from the water by the pump 116 may be removed by filter 124 or filter 138, which are discussed in greater detail below, and diverted to the equalization basin 104. The solids that are diverted to the equalization basin 104, whether via the pump 116 or a filter 124 or 138, are typically very stabilized. In an alternative embodiment, the pump 116 may discharge the WAS from the reactor 106 to another basin 120, digester or other disposal 170 (via conduit 172), sludge management structure, disposal site or facility. Alternatively, as set forth below, the basin 120, which is the repurposed existing second lagoon basin 14, may serve as a polishing pond and/or effluent flow equalization basin.

The reactor 106 can be adapted for automatically switching into a storm mode if increased wastewater inflow, due to a storm event, overwhelms its capacity to operate in its normal mode. While the flow diverter 102 and equalization basin 104 in some embodiments (see FIGS. 2-5) and valve 152 and/or a pump and equalization basin 104 in another embodiment (see FIG. 6) located upstream of the reactor 106 mitigate the chances that the reactor 106 will experience an inflow rate greater than its design flow rate $Q_R$, the reactor 106 may be required to switch to a storm mode in severe cases in order to prevent the reactor 106 from overflowing. As an additional measure, an overflow outlet (not shown) may be installed within the reactor 106. In severe cases where the inflow rate into the reactor 106 is greater than its design flow rate $Q_R$, the water level in the reactor 106 will continue to rise until it contacts a probe or activates a water level switch (not shown). When the probe or switch is activated, storm mode is initiated.

Under normal operation, the reactor 106 may, for example, undertake a four-hour treatment cycle that includes two hours of aeration, one hour of settling and one hour of decanting. However, in its storm mode, the reactor 106 may be programmed to undergo a shorter period of aeration or even eliminate aeration altogether in cases where the inflow into the reactor 106 exceeds a specified level. During major storm events, the influent wastewater is diluted and, therefore, not as much treatment is required. The reactor's storm mode is designed to automatically accommodate larger flows of wastewater (i.e., flows greater than the design flow rate $Q_R$) and do so without the loss of the biomass contained within the reactor 106 and also without losing a high degree of treatment. The storm mode provides the reactor 106 with operational flexibility, protects the integrity of the treatment of the wastewater and may be implemented at a reasonable cost.

The amount of biomass in the reactor 106 significantly affects the level of treatment that can be undertaken within the reactor 106. The use of attached growth biomass and suspended growth biomass assure adequate treatment of the wastewater even during storm events. The attached growth biomass is particularly important for retaining biomass during periods of large hydraulic surges through the reactor 106. Suspended growth organisms are more vulnerable to hydraulic washout.

It has been documented that for every 10° C. the wastewater increases in temperature, the biological reaction rate is doubled. Conversely, for every 10° C. the wastewater decreases in temperature, the biological reaction rate is cut in half. Accordingly, controlling the temperature of the wastewater treated within the reactor 106 is important. Placing the reactor 106 proximate the front end of the system 100 promotes treating the wastewater prior to a loss in the wastewater's temperature, particularly when the temperature of the ambient air is lower than the temperature of the influent wastewater.

During winter and early spring months, the biological reaction rate may be dramatically reduced regardless of efforts to conserve heat within the wastewater. During periods of cold temperatures (e.g., under 10° C.), the rate at which biomass organisms are lost can be greater than the rate at which they reproduce thereby resulting in a continual net loss in biomass organisms. This is further compounded by the fact that significant hydraulic events often occur during the winter and early spring months due to snow melt and springtime rains. Accordingly, to improve nitrification reactions during colder months, one embodiment of the present invention includes a method for accumulating and increasing biomass prior to such colder months. During the summer months, the reactor 106 may be operated at reduced mixed liquor suspended solids (MLSS) due to biological oxidation and the wasting of suspended solids from the reactor 106. During the fall months, the MLSS concentration may be increased by maintaining biomass in the reactor until the MLSS concentration is between about two and four times greater than it is during the summer months. As such, a significant amount of biomass accumulates in the reactor 106 as a reserve for operation during the colder winter and early spring months. Thus, one aspect of the present invention involves a method of operating the reactor 106 in a warm weather/cold weather cycle (e.g., summer/winter cycle) wherein during the warm weather months, MLSS and other solids are reduced and disposed in order to minimize operation issues or energy costs and, during the cold weather months, MLSS and other solids are retained by controlling the sludge wasting rate and improving the decanting operation in order to retain the solids at a higher concentration of between typically two and four times that of the warm weather months is achieved. The step of allowing the concentration of MLSS to increase in the reactor 106 may be triggered when one or more first conditions or parameters are met. For example, the retention of MLSS may commence when a temperature of the wastewater decreases from a temperature that is equal to or greater than the predetermined temperature to a temperature that is less than the predetermined temperature. The increased amount of biomass in the reactor 106 ensures that a similar level of treatment may be achieved during the periods of colder temperatures. Accordingly, the increased amount of biomass (MLSS) results in desirable treatment being achieved even during periods of time when the reaction rate is reduced and/or the detention time of the wastewater is reduced because of significant hydraulic or storm events.

Decanter

A decanter or effluent withdrawal device (not shown) may be implemented in connection with the reactor 106, as taught by the '537 application. The decanter is designed to assure retaining enough active biomass in the reactor 106 to maintain the biological processing within the reactor 106 at all hydraulic or organic loadings and all temperatures.

Partial Mix and Polishing Basin 154

In one embodiment, downstream from the reactor 106, the system 100 includes a basin 154 having a partial mix aerated cell 156 and a polishing cell 158. The partial mix cell 156 and a polishing cell 158 may be separated by a rigid or flexible wall or curtain 160, which may include arrays of bio media. In one embodiment, the wall or curtain 160 is similar in nature that described in U.S. Pat. No. 8,758,620 to Tharp, et al. and may comprise systems marketed by Environmental Dynamics International, Inc. under the BioReef® or Bio-Curtain™ names. In other embodiments, the wall 160 may be a berm that is formed within the basin. The wall 160 may baffle the flow of wastewater between the partial mix cell 156 and polishing cell 158. As demonstrated, the reactor 106 is connected to the partial mix cell 156 of the basin 154 via conduit 162.

In alternative embodiment, the reactor 106 is connected to the polishing cell 158 of the basin 154 via a bypass conduit 164. In this embodiment, the wastewater exiting the reactor 106 optionally bypasses the partial mix cell 156, depending upon certain conditions, such as warming trends that are typically experienced during springtime months. The wastewater may be optionally bypassed from the reactor 106 to the polishing cell 156 via conduit 164 during a period of time after the temperature of the wastewater has reached a predetermined temperature during the springtime warmup. In other cases, where primary solids, sludge and/or WAS are removed from the reactor 106 to the equalization basin 104, the partial mix cell 156 may optionally be eliminated and all wastewater discharged from the reactor 106 would flow directly into the polishing cell 158, or directly to a filter for filtering solids, as effluent from the reactor 106 is of high quality and ammonia rebound or biological rebound would not be a concern.

Flocculation Tank 122

Another embodiment of the system 100 includes a means for removing phosphorus from the wastewater. Regulatory agencies, such as the EPA, have implemented and increased the restrictions on the amount of all nutrients of nitrogen and phosphorus that may be contained within effluent water discharged into streams, rivers and other bodies of water. Proper operation of reactor 106 can remove ammonia and total nitrogen to acceptable levels; however, phosphorous typically requires additional process additives. To reduce the amount of phosphorus in the effluent water, the wastewater may be subjected to a flocculation process prior to its release from the system 100. The system 100 can include a flocculation process either through the addition of alum or other flocculation chemical directly to the bioreactor 106, or by utilizing a separate flocculation tank 122 into which alum or other flocculation chemical may be added to the water. The alum or other flocculation chemical causes the phosphorus (or other contaminants) to come out of suspension in the form of floc that can be captured and removed from the water in the polishing pond 120 or by a filter 124, as discussed in more detail below. As demonstrated, the flocculation tank 122 is connected to the reactor via conduit 126.

Figure 4:
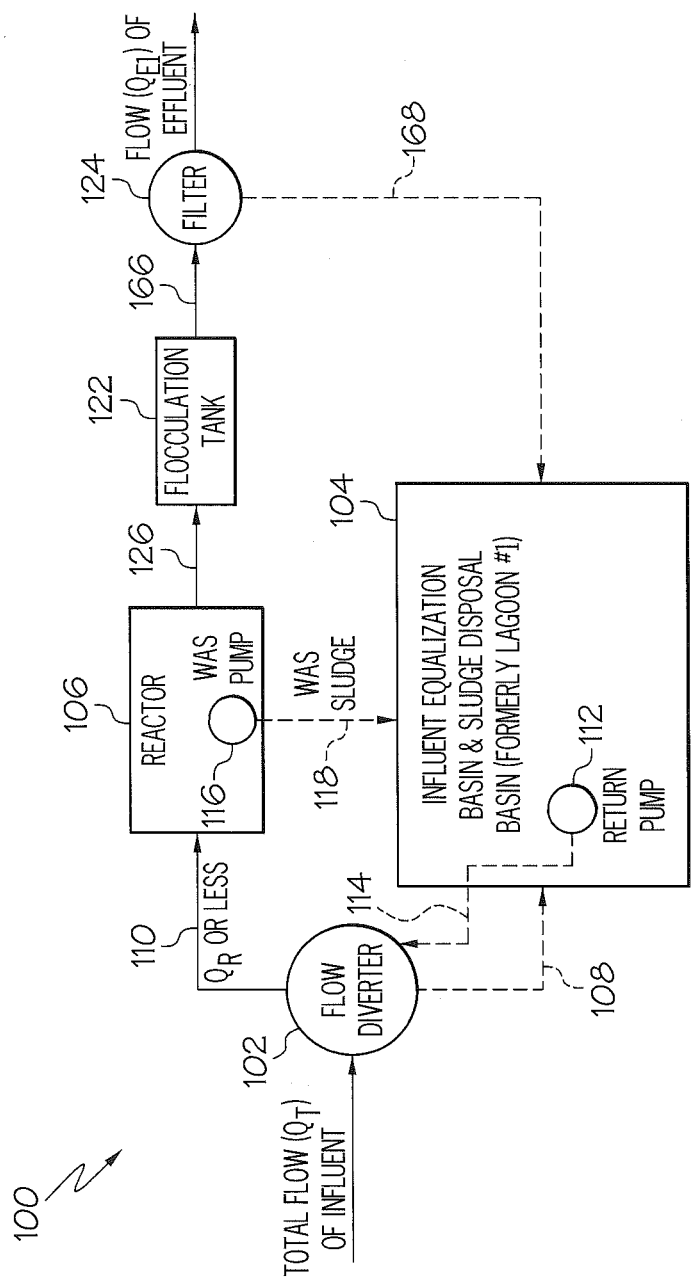
FIG. 4 is a plan view of a wastewater treatment system in accordance with a third embodiment of the present invention.

In one embodiment, for example the embodiment shown in FIG. 4, it will be appreciated that tank 122 may also optionally perform post-reactor flow equalization with or without filter 124. The discharge from the reactor 106, when it occurs, is higher than the average flow into the reactor 106 since the discharge from the reactor 106 occurs on an intermittent basis. In one case, as described above (where the reactor 106 undertakes a four-hour treatment cycle that includes two hours of aeration, one hour of settling and one hour of decanting), the discharge flow from the reactor 106, when it occurs, is about four times greater than the average flow into the reactor 106. Without the tank 122 performing flow equalization, the filters 124 would need to be larger in size in order to accommodate the large intermittent discharge flows from the reactor 106.

Effluent Flow Equalization Tank 128

Downstream from the reactor 106 or tank 122, the system 100 may include an optional effluent flow equalization tank 128 for buffering the intermittent discharges from the reactor 106 and discharging treated or effluent wastewater from the system 10 at a rate that does not exceed a predetermined discharge rate to protect downstream processes, such as ultraviolet (UV) disinfection. It will be appreciated that the effluent flow equalization tank 128 need only be implemented if there is no tank 122 or if the flocculation tank 122 is not adapted to perform flow equalization, as described above.

The equalization tank 128 is connected to tank 122 via conduit 130, may be in the form of a small concrete basin and can be adapted for providing temporary storage for holding effluent water so that it may be released at a relatively steady volumetric flow rate ($Q_{E1}$), whether the effluent water is being released through a filter 124, UV disinfection or discharged directly into a stream, river or other body of water. Alternatively, the effluent, flow equalization may be undertaken by the polishing pond 120, which may be in the form of the repurposed lagoon basin 14, can be adapted for providing temporary storage for holding effluent water so that it may be released at a relatively steady volumetric flow rate ($Q_{E2}$), whether the effluent water is being released through a filter 132, UV disinfection or discharged directly into a stream, river or other body of water. While illustrated as two separate components in FIG. 5, it will be appreciated that the flocculation tank 122 and effluent flow equalization tank 128 may be combined as a single tank.

Filter 124

Figure 5:
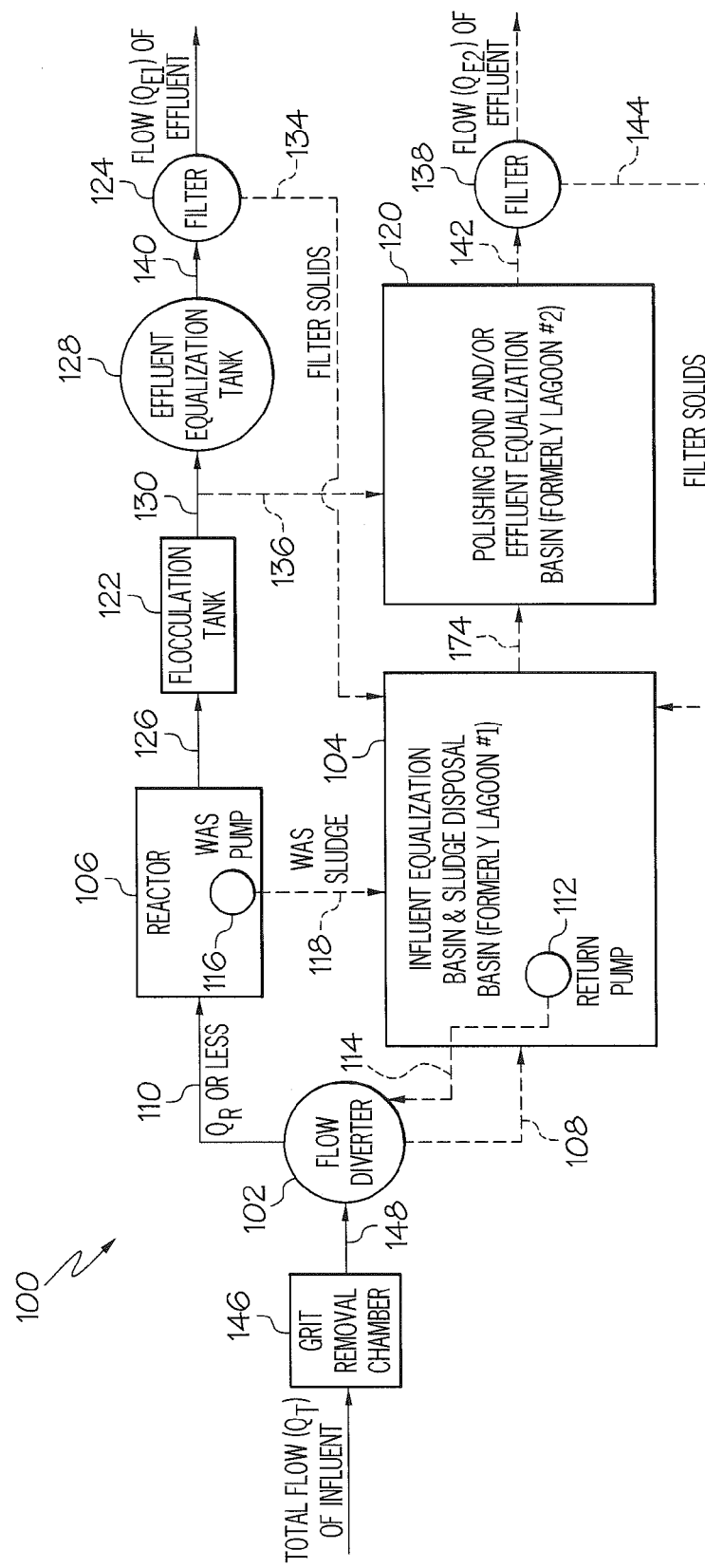
FIG. 5 is a plan view of a wastewater treatment system in accordance with a fourth embodiment of the present invention.
Figure 6:
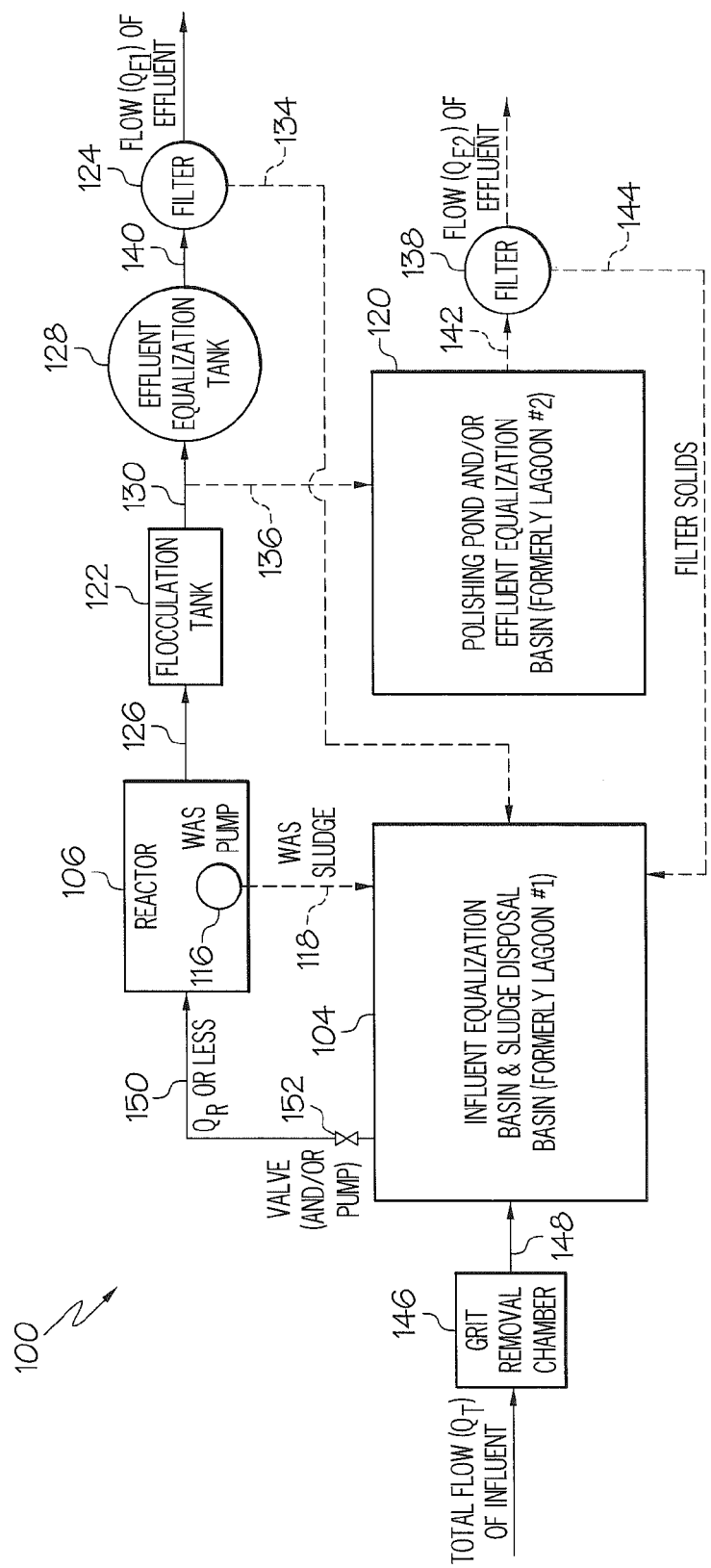
FIG. 6 is a plan view of a wastewater treatment system in accordance with a fifth embodiment of the present invention.

The floc or solids generated in the bioreactor or the flocculation tank 122, as well as other suspended solids, may be allowed to settle in polishing pond 120 or may be filtered out of the effluent water by a filter 124, which is optionally connected to the flocculation tank 122 via conduit 166 (see FIG. 4) or the effluent flow equalization tank 128 via conduit 140 (see FIGS. 5 and 6). Accordingly, the filter 124 may trap both biosolids and chemical solids that result from the addition of the alum or other flocculation chemical.

In one embodiment, the filter 124 comprises a cloth filter in the form of a drum. Examples of this type of filter include the BioDISC™ filter distributed by Wastewater Technologies, Inc. and the SuperDisc™ filter distributed by WesTech Engineering, Inc. In cases where the filter 124 is a constant rate device, the effluent flow equalization tank 128 can be designed to discharge a relatively constant flow of effluent water to the filter 124. Alternatively, the filter 124 could be sized to filter the high rates of flow that are intermittently discharged from the reactor 106, although this approach may not be as economical. Solids (e.g., biosolids, chemical solids and other suspended solids) collected by the filter 124 may optionally be directed to a separate sludge management system or digester or to the equalization basin 104 via conduit 168 (see FIG. 4) or via conduit 134 (see FIGS. 5 and 6) for storage or management, just the same as WAS from the reactor 106 may be directed to the equalization basin 104 for storage management.

In cases where the water is diverted to the polishing pond 120 via conduit 136, a filter 138 may be connected to the discharge end of the polishing pond 120 via conduit 142. Like with filter 124, the solids collected by filter 138 may be directed to the equalization basin 104 via conduit 144 or to other sludge disposal, digester or sludge management facilities.

Polishing Pond 120

A polishing pond 120 is optionally provided downstream from the reactor 106 to settle out any remaining solids in the effluent water prior to discharge. As illustrated, a lagoon basin 14 (i.e., lagoon basin #2) of an existing lagoon system 10 may be repurposed to serve as the polishing pond 120 of the system 100 of the present invention. In one embodiment, the detention time of the effluent water in the polishing pond 120 may be about 3 to 15 days when repurposing an existing lagoon. Because all (or most) of the biological treatment of the water is undertaken in the reactor 106, the temperature of the water in the polishing pond 120 is generally not critical. The polishing pond 120 can also serve to equalize the flow that is intermittently discharged from the reactor 106 prior to filtration, disinfection and/or discharge. It will be appreciated that the polishing pond 120 may be positioned upstream from (i.e., ahead of) the flocculation tank 122 in order to minimize or mitigate variations in the flow into the flocculation tank 122 and/or other downstream processes. This provides a generally constant flow into the flocculation tank 122 thereby simplifying the chemical (e.g., alum or other flocculation chemical) dosage into the flocculation tank 122. It will further be understood that, in one embodiment, the flow equalization function of the polishing pond 120 may occur in a relatively small section of the polishing pond 120 that is sectioned off from the remainder of the polishing pond 120. If the entire polishing pond 120 were utilized for flow equalization, it is possible that algae buildup within the polishing pond 120 could impact the performance of the downstream filter 124.

Filter 138

It is possible that due to the combination of its shallow depth and warmer temperature, the secondary lagoon basin 14 of the existing lagoon system 10 may have experienced a long term buildup of nutrients or solids prior to its conversion to a polishing pond 120 in accordance with the present invention. Further, the polishing pond 120 may generate nutrient rebound from benthel sludge deposits or may generate an amount of algae that exceeds the limit of suspended solids and/or BOD levels allowed in the plant discharged effluent.

Accordingly, it may be necessary to incorporate an effluent filter 138 downstream of the polishing pond 120 in order to filter solids and leave the effluent to be discharged with suspended solids less than approximately 5 mg/L, for example. The filter 138 could also reduce or remove any excess BOD associated with those suspended solids. In one embodiment, the BOD is reduced to less than 5 mg/L and the suspended solids are reduced to less than 2 mg/L. The filter 138 may also be suitable for capturing the floc generated in the phosphorous/solids flocculation tank 122.

Like filter 124, filter 138 may be any filter suitable for removing suspended solids from the water. In one embodiment, the filter comprises a cloth filter in the form of a drum. Examples of this type of filter include the BioDISC™ filter distributed by Wastewater Technologies, Inc. and the SuperDisc™ filter distributed by WesTech Engineering, Inc. The sludge trapped by the filter 138 can be pumped back to the influent flow equalization basin 104 for storage and disposal. Alternatively, if the original second lagoon basin 14 is not being utilized as a polishing pond, the sludge from WAS pumps 116 and filter backwash solids from filters 124 or 138 can be pumped into that basin 120 for storage and disposal. It will be appreciated that typically only one flow path incorporating only one filter is anticipated, i.e., the use of either filter 124 or filter 138, depending on process selected for treating wastewater.

Screen/Grit Removal Chamber 146

The system 100 may further optionally include a grit removal chamber 146 and/or coarse screen located upstream of the reactor 106 for removing large solid objects (e.g., sand and larger) from the influent wastewater. Grit removal/screen components 146 are not required for the process, but may be employed to minimize operator attention. The grit removal chamber 146 may be connected to the flow diverter 102, as shown in FIG. 5, or equalization basin 104, as shown in FIG. 6, via a conduit 148.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A wastewater treatment system comprising:
   a lagoon basin of an existing lagoon system repurposed to function as an influent flow equalization basin;
   a reactor for treating wastewater at a flow rate that is equal to or less than a predetermined flow rate for which the reactor is designed;
   a flow diverter for:
      directing a first portion of said wastewater to said reactor for treatment at a rate equal to or less than said predetermined flow rate; and
      directing a second portion of said wastewater that is in excess of said predetermined flow rate to said influent flow equalization basin for storage when wastewater is received by said wastewater treatment system at a rate in excess of said predetermined flow rate; and
   an integrated control system for controlling the transfer of wastewater, and a conduit for transferring, wastewater stored in said influent flow equalization basin to said reactor for treatment when (a) a temperature of the wastewater being stored in said influent flow equalization basin is equal to or greater than a predetermined temperature and (b) wastewater is received by said wastewater treatment system at a rate less than said predetermined flow rate.

2. The wastewater treatment system of claim 1 further comprising a pump for discharging waste activated sludge from said reactor to at least one of a digester, a sludge management structure or said influent flow equalization basin.

3. The wastewater treatment system of claim 1 further comprising another lagoon basin of said existing lagoon system repurposed to function as at least one of a polishing pond or an effluent flow equalization basin.

4. The wastewater treatment system of claim 1 further comprising an effluent flow equalization basin downstream of said reactor for discharging treated wastewater from said wastewater treatment system at a rate that does not exceed a predetermined discharge rate.

5. The wastewater treatment system of claim 1 further comprising a filter downstream of said reactor and a conduit for directing solids collected by said filter to said influent flow equalization basin.

6. The wastewater treatment system of claim 1, wherein said predetermined temperature is less than approximately 10° C.

7. The wastewater treatment system of claim 1, wherein said reactor comprises at least one of a concrete basin, a concrete tank or an earthen basin.

8. A method for treating wastewater in a wastewater treatment system, said method comprising the steps of:
   providing an influent flow equalization basin;
   providing a reactor for treating said wastewater at a flow rate that is equal to or less than a predetermined flow rate, wherein said predetermined flow rate is equal to or less than a maximum flow rate for which the reactor is designed;

directing wastewater to said reactor at a flow rate equal to or less than said predetermined flow rate;

when wastewater is received by said wastewater treatment system at a rate in excess of said predetermined flow rate, storing wastewater in excess of said predetermined flow rate in said influent flow equalization basin; and directing wastewater stored in said influent flow equalization basin to said reactor when (a) a temperature of the wastewater being stored in said influent flow equalization basin is equal to or greater than a predetermined temperature, wherein said predetermined temperature is a temperature between about 3° C. and about 14° C., and (b) wastewater is received by said wastewater treatment system at a rate less than said predetermined flow rate.

9. The method of claim 8, wherein said predetermined temperature is approximately 10° C.

10. The method of claim 8 further comprising the step of repurposing a lagoon basin of an existing lagoon system to function as said influent flow equalization basin.

11. The method of claim 8 further comprising the step of providing a flow diverter, wherein said flow diverter directs portion of said wastewater received by said wastewater treatment system that is in excess of said predetermined flow rate to said influent flow equalization basin for storage.

12. The method of claim 8 further comprising the steps of:
providing a flow diverter;
pumping said wastewater stored in said influent flow equalization basin from said influent flow equalization basin to said flow diverter; and
directing said wastewater from said flow diverter to said reactor.

13. The method of claim 8 further comprising the step of discharging waste activated sludge from said reactor to at least one of a digester, a sludge management structure or said influent flow equalization basin.

14. The method of claim 8 further comprising the step of repurposing a lagoon basin of an existing lagoon system to function as at least one of a polishing pond or an effluent flow equalization basin.

15. The method of claim 8 further comprising the steps of:
providing an effluent flow equalization basin downstream of said reactor; and
discharging treated wastewater from said effluent flow equalization basin at a rate that does not exceed a predetermined discharge rate.

16. The method of claim 8 further comprising the steps of:
providing a filter downstream of said reactor; and
directing solids collected by said filter to at least one of a digester, a sludge management structure or said influent flow equalization basin.

17. The method of claim 8 further comprising the step of allowing a concentration of mixed liquor suspended solids (MLSS) to increase in said reactor when a first condition is met.

18. The method of claim 17, wherein said first condition is met when a temperature of said wastewater decreases from a temperature that is equal to or greater than said predetermined temperature to a temperature that is less than said predetermined temperature.

19. The method of claim 17, wherein during winter months the concentration of MLSS in said reactor is between about two times and about four times greater than a concentration of MLSS in said reactor during summer months.

20. The method of claim 8, wherein when said influent flow equalization basin is substantially full and wastewater is received by said wastewater treatment system at a rate in excess of said predetermined flow rate, wastewater from said influent flow equalization basin is directed through a filter prior to discharge from said wastewater treatment system, without first passing through said reactor.

* * * * *